United States Patent
Hammond et al.

(10) Patent No.: US 8,260,874 B1
(45) Date of Patent: Sep. 4, 2012

(54) REQUEST INITIATED COLLATERAL CONTENT OFFERING

(75) Inventors: Kristian Hammond, Chicago, IL (US); Jerome Budzik, Winthrop Harbor, IL (US); Lawrence Birnbaum, Evanston, IL (US); Kevin Livingston, Chicago, IL (US); Mark Dredze, Chicago, IL (US)

(73) Assignee: Northwestern University, Evanston, IL (US)

( * ) Notice: Subject to any disclaimer, the term of this patent is extended or adjusted under 35 U.S.C. 154(b) by 2815 days.

(21) Appl. No.: 10/754,631

(22) Filed: Jan. 12, 2004

Related U.S. Application Data

(60) Provisional application No. 60/439,280, filed on Jan. 10, 2003.

(51) Int. Cl.
   G06F 15/16 (2006.01)
   G06F 7/00 (2006.01)
   G06F 17/30 (2006.01)
(52) U.S. Cl. ........ 709/217; 709/218; 707/705; 707/706; 707/707; 707/708; 707/709; 707/710
(58) Field of Classification Search .................. None
   See application file for complete search history.

(56) References Cited

U.S. PATENT DOCUMENTS

| | | | | |
|---|---|---|---|---|
| 4,845,658 A * | 7/1989 | Gifford | ............... | 709/217 |
| 5,790,935 A * | 8/1998 | Payton | ............... | 725/91 |
| 5,850,218 A * | 12/1998 | LaJoie et al. | ............... | 725/45 |
| 5,861,906 A * | 1/1999 | Dunn et al. | ............... | 725/87 |
| 6,005,561 A * | 12/1999 | Hawkins et al. | ............... | 715/500.1 |
| 6,006,218 A * | 12/1999 | Breese et al. | ............... | 707/3 |
| 6,374,404 B1 * | 4/2002 | Brotz et al. | ............... | 725/46 |
| 6,430,602 B1 * | 8/2002 | Kay et al. | ............... | 709/206 |
| 6,463,428 B1 * | 10/2002 | Lee et al. | ............... | 707/750 |
| 6,473,751 B1 * | 10/2002 | Nikolovska et al. | ............... | 1/1 |
| 6,484,164 B1 * | 11/2002 | Nikolovska et al. | ............... | 1/1 |
| 6,493,707 B1 | 12/2002 | Dey et al. | | |
| 6,499,029 B1 * | 12/2002 | Kurapati et al. | ............... | 707/750 |
| 6,505,194 B1 * | 1/2003 | Nikolovska et al. | ............... | 707/768 |
| 6,662,177 B1 * | 12/2003 | Martino et al. | ............... | 1/1 |
| 8,108,892 B1 * | 1/2012 | Durkee et al. | ............... | 725/34 |
| 2001/0007105 A1 * | 7/2001 | Brotz et al. | ............... | 707/1 |
| 2001/0033736 A1 * | 10/2001 | Yap et al. | ............... | 386/46 |
| 2001/0051942 A1 * | 12/2001 | Toth | ............... | 707/3 |
| 2002/0026320 A1 * | 2/2002 | Kuromusha et al. | ............... | 704/270 |
| 2002/0054750 A1 * | 5/2002 | Ficco et al. | ............... | 386/46 |
| 2002/0054752 A1 * | 5/2002 | Wood et al. | ............... | 386/83 |
| 2003/0160759 A1 * | 8/2003 | Martino et al. | ............... | 345/157 |
| 2005/0038699 A1 * | 2/2005 | Lillibridge et al. | ............... | 705/14 |
| 2012/0084822 A1 * | 4/2012 | Durkee et al. | ............... | 725/93 |

* cited by examiner

*Primary Examiner* — Krista Zele
*Assistant Examiner* — Tariq Najee-Ullah
(74) *Attorney, Agent, or Firm* — McDermott Will & Emery LLP

(57) ABSTRACT

A system and method in accordance with the present disclosure provide collateral information to a user receiving primary information via a first user interface. The system and method receives a user request for the collateral information. A context is defined from the primary information. A user's probable collateral information needs are derived from the context. The system and method then map the needs to one or more information repositories, and query the information repositories and retrieve collateral information satisfying the needs. The collateral information is presented via at least one user interface, which may include the first user interface. The system and method provide user controls via the at least one user interface to facilitate exploration of the collateral information by the user.

10 Claims, 4 Drawing Sheets

REQUEST INITIATED COLLATERAL CONTENT OFFERING

CROSS REFERENCES TO RELATED APPLICATIONS

The present application claims priority from U.S. Provisional Patent Application Ser. No. 60/439,280, entitled "REQUEST INITIATED COLLATERAL CONTENT OFFERING," filed Jan. 10, 2003, which is incorporated herein by reference in its entirety.

STATEMENT OF GOVERNMENT INTEREST

The U.S. Government has no interest in the present application.

FIELD OF THE DISCLOSURE

The inventive concepts relate to systems and methods used in presenting content to users. More specifically, the inventive concepts relate to systems and methods for providing content that is related or collateral to primary content.

BACKGROUND

The current broadcast model of television programs, and radio programs for that matter, provides no context oriented means of interaction with members of the audience. The producers of such programs have limited resources (e.g., primarily the time and expertise to delve to extended depths in all topic areas), and thus they generate programs suitable for the greatest number of viewers or listeners in their target audience, and one that fits within the time constraints of medium (e.g., television). All members of the audience, however, are not identical in their information needs and interests.

As an example, television broadcast news is one type of program for which at least some viewers may find themselves wanting for more information (or content). That is, news is insufficient for conveying complete and useful information to all television viewers, since the information needs or wants of all viewers differ. For the most part, a person's information needs are grounded in his or her context or task. Not only will such contexts and tasks differ among viewers, they may also differ for a given viewer over time. However, current systems and methods of presenting programs via television and radio, as examples, treat such programs as an end product. They offer no way for a viewer to quickly gain access to related or collateral information.

Research in the indexing and retrieval of broadcast news and in the retrieval of information relevant and useful to viewers of broadcast news has primarily focused on news summarization, the generation of personalized news broadcasts (i.e., "personalcasts"), and providing news on demand (NOD), see Brown, M. G., Foote, J. T., Jones, G. J. F., Sparck Jones, K., and Young, S. J., *Automatic Content-based Retrieval of Broadcast News*, Proceedings of ACM Multimedia. San Francisco, pp. 35-43, (1995); Maybury, M., *News on Demand*, Communications of the ACM, 43(2), pp. 33-34, (February 2000) (hereinafter "Maybury"); and Wilcox, L., and Boreczky, J. S.:, *Annotation and Segmentation for Multimedia Indexing and Retrieval*, HICSS, pp. 259-266, (1998). Also, related to this work are automated question and answer systems, which attempt to provide synthesized answers to user queries, see Light, M., Maybury, M., *Personalized Multimedia Information Access*, Communications of the ACM, 45(5), pp. 54-59, (May 2002). A survey of much of this work can be found in Maybury.

These systems generally require explicit interaction by the user to attempt to communicate his or her context to the system or to know her needs up front and provide queries for the information of interest, so they are not particularly efficient from the user's perspective. However, the user often does not know the information that he or she wants ahead of time, and even if he or she does, communicating with an information retrieval (IR) engine is a task that is difficult to do proficiently, even for advanced users. In addition, as previously discussed, news stories that discuss a topic of interest to the viewer likely do not go into sufficient detail, and the use of many traditional IR systems by the user to retrieve additional information is subject to information overload. For example, use of Internet search engines, such as Google, to find expanded and useful information often result in too numerous potentially matching documents. Typically, many of these documents are similar, but not necessarily useful to the user.

SUMMARY OF THE DISCLOSURE

A system and method in accordance with the present disclosure provides related or collateral information to a user receiving a primary information via a first user interface system. Such a system includes means for, and such a method includes the steps of, receiving a user request for the collateral information; defining a context from said primary information; deriving a user's probable collateral information needs from the context; mapping the needs to one or more information repositories; querying the information repositories and retrieving collateral information satisfying the needs; presenting the collateral information via at least one user interface, which may include the first user interface; and providing user controls via the at least one user interface to facilitate exploration of the collateral information by the user. The system works to present information that is not only relevant, but also useful to the viewer. This information is obtained through careful information source selection based on the viewer's context in real time.

In some forms, an exemplary method and system according to this disclosure may include providing collateral content automatically, as a companion or an alternative to request-based providing of content.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

Figure 1:
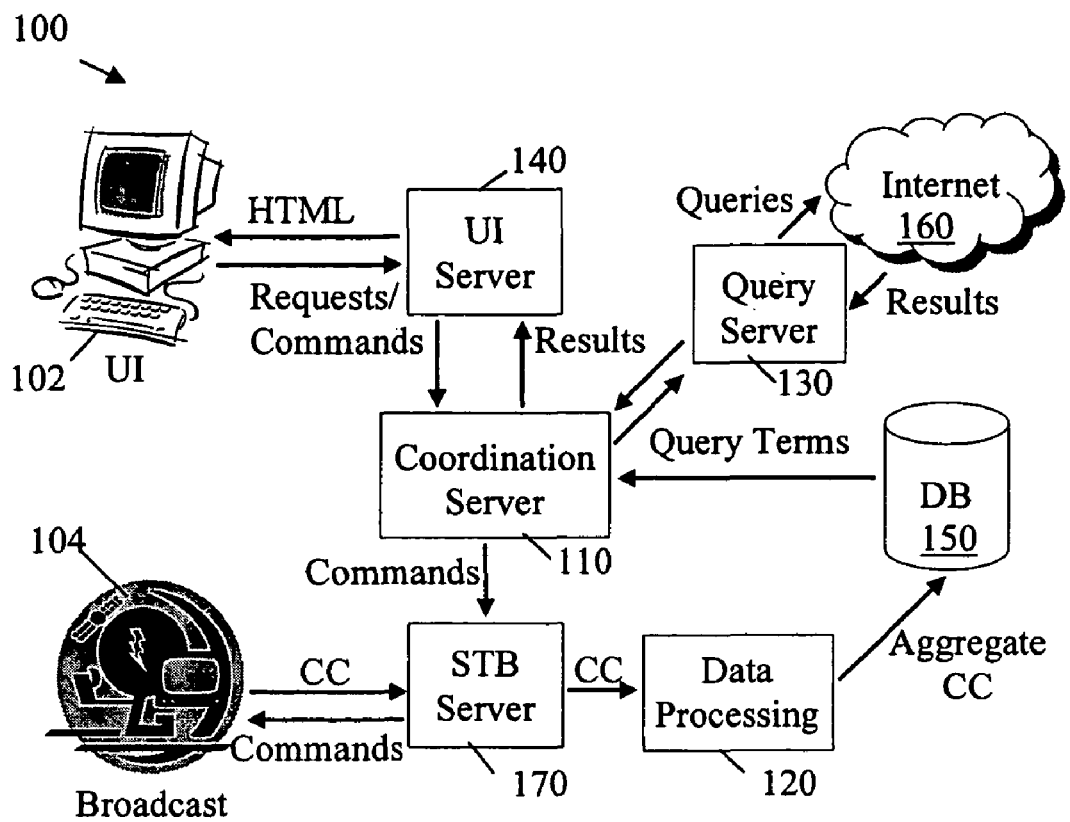
FIG. 1 is a block diagram of a representative architecture of system for providing collateral information to a user receiving a primary information, in accordance with the present disclosure.

A system and method in accordance with the present disclosure provides related or collateral information to a user receiving primary information via a first user interface. Wherein, the preferred embodiment includes receiving a user request for the collateral information; defining a context from said primary information; deriving a user's probable collateral information needs from the context; mapping the needs to one or more information repositories; querying the information repositories and retrieving collateral information satisfying the needs; presenting the collateral information via at least one user interface, which may include the first user interface; and providing user controls via the at least one user interface to facilitate exploration of the collateral information by the user.

Generally, as used herein, the terms "content" and "information" are considered to be synonymous, unless otherwise stated. And, a user interface may include, but is not limited to, audio input and/or output means, video input and/or output means, IR and/or RF signal input means or any other form of digital or analog input and/or output means, or any combination of the foregoing. Also, as used herein the term "collateral" content or information is considered to mean any content which has a relationship to the primary information; there are no particular restrictions imposed on such relationships.

In the preferred embodiment, broadcast television news is used as a representative program. Broadcast news was selected as an illustrative example because the news is fairly well structured and viewer information needs are easy to identify. However, those skilled in the art will appreciate that methods and systems according this disclosure may be implemented with other types of programs in any of a variety of forms of media. There is no limit to the types of television programs or content can be used, including, but not limited to sports events, political debates, sitcoms, movies, weather, music videos, game shows, soap operas, educational programs, commercials and so on. Methods and systems according to this disclosure may also be used with radio programs, so long as a means is provided for user interaction such that a request related to the primary information can be formed. Also, Methods and systems according to this disclosure may be used with any type of broadcast, such as those presented via a network (e.g., Internet, Web, and so on). The program may be live or recorded; it is immaterial. It is only necessary that a context can be defined with respect to the primary information.

The broadcast news content is used as an index of events and stories, as opposed to considering broadcast news to be the terminus of the viewer's exploration of the story. The system provides a gateway from this index into expanded and useful information, gathered from both general and domain specific information repositories, regarding areas of the news that are of specific interest to each individual viewer, as described more fully below. In the preferred form, the broadcast news is closed captioned (CC), so the content is available as fairly well structured text. This type of well structured information allows for relatively easy and reliable context determination. In other embodiments, other types of structure may be used, e.g., message formats, or cues within unstructured content could be used to define or determine a context for the primary information.

Preferably, the system provides television viewers with just in time information to fill their information needs as they arise. A viewer's information needs are grounded in the context of what she is currently viewing on television, referred to as the primary information or content. A representation of this context is built by analyzing the content.

A collection of probable information needs is derived from the context. In the broadcast news embodiment, a model is formed that identifies information needs for viewers of the news. For broadcast news, the model may identify five major dimensions (or areas) of information exploration: 1) related coverage, 2) focused opinions, 3) in depth analysis of the subject, 4) explanation of key entities, and 5) a general overview or background of the subject. Other, or different areas may be defined. Using a representation of the context to ground the information needs, the system provides content that will be useful to the viewer in exploring one or more of these areas. Each of these areas, for example, may be considered to define types of relationships to the primary content.

Each need is mapped to one or more information repositories, which are queried for the requested collateral information that will satisfy the viewer's needs. Categories of information repositories are identified for satisfying each of the specified areas of information needs. For instance, related coverage in the form of news stories about the same topic can be retrieved from online newspapers and other web based news media. These sources are most similar to the broadcast media and provide more breadth. A range of opinions can be provided on the same story by identifying opinioned or biased media. Information needs for understanding the story in more depth are fulfilled by detailed documents provided by domain specific information repositories, such as a business analyst's review of a company. The viewer may want answers to pointed questions about a person, country, business or another entity discussed or featured in the story. Searching repositories with specific types of content allows the system to present the viewer with in-depth information regarding the areas of interest. For example, if the viewer is watching a story about new progress in the Middle East peace process, news sources of opinioned information are presented, including newspapers local to the Middle East. Whereas, if the story is about a business, sources providing in-depth analysis and information about companies can be queried. Finally, some viewers may not have been following a particular story, but may have later developed an interest and require a summary of the story, which is provided by domain specific repositories, such as the history of a country.

Continuing with the Middle East example, if a television viewer is watching a news story detailing the most recent Israeli-Palestinian developments, and the viewer is not familiar with the situation and would like a history of what is going on, she merely needs to press an 'interest' button provided on her television remote control. The system will establish a representation for the viewer's needs, by analyzing the same primary content that the viewer has been watching. The system, as previously mentioned, will infer several information needs that the viewer is likely to have, including interest in 1) related stories, 2) opinions regarding the current story, 3) more detailed coverage of the current story, 4) a broad overview of the history of the larger story of which this story is a part, and 5) background and history of the key players.

The system will then dynamically select resources to query for information to satisfy these needs. In the above example, the system might query general news sources such as The New York Times, the Chicago Sun Times, and Google News to satisfy need 1), and to a lesser degree to satisfy need 3). Once the system has identified the story as being related to the Middle East, it can generate or obtain varied opinions on the story by querying the Jerusalem Post and the Cairo Times, for example, in order to satisfy need 2), which will also generate additional information related to needs 1) and 2). Information satisfying needs 4) and 5) is obtained by retrieving encyclopedia style entries (as well as maps) for countries in the region, as well as any political leaders mentioned in the story, from InfoPlease.com and Encarta, for example.

FIG. 1 provides an example of a system architecture 100 that may be used to implement a system and method in accordance with the present disclosure. The architecture 100 of FIG. 1 includes several autonomous modules. Each module is designed to perform specific tasks, conducting input and output in protocols defined over XML through sockets. In the preferred form, the code is largely platform independent and primarily implemented in Perl, with some TCL running on the set top box itself. Other than using the same protocol, there are no other inter-module dependencies in this embodiment. This architecture 100 allows several freedoms and advantages over a monolithic system, including flexibility in how the system is deployed and run, and for easy use of future extensions and improvements. Those skilled in the art will appreciate that other architectures could be used to implement methods and systems according to this disclosure, and that methods and systems according to this disclosure are not limited to the architecture 100 of FIG. 1.

Figure 2:
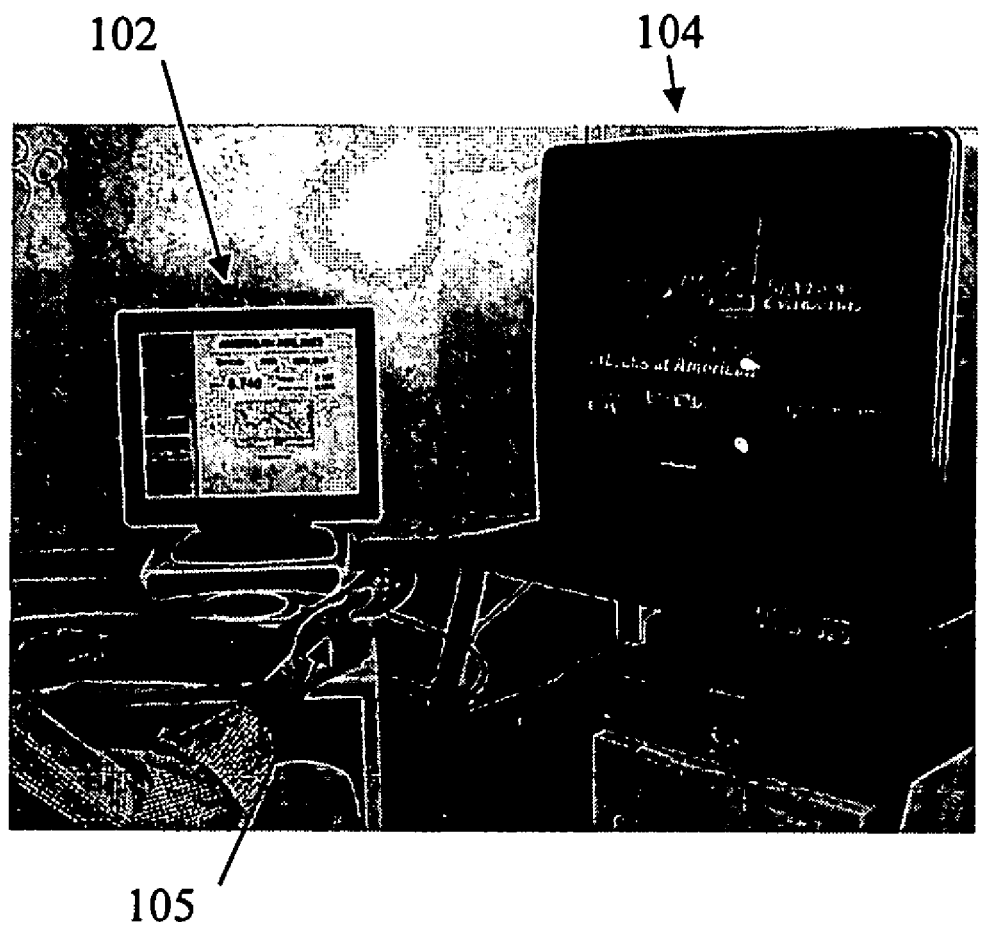
FIG. 2 is a diagram of a configuration of a set top box and web enabled device of FIG. 1.

With respect to FIG. 1, the viewer's interaction with the system may occur through a web enabled device 102, and through interaction with the set top box (STB) 104 directly, as an example. Device 102 may be any type of network enabled device, such as a personal computer, laptop computer, personal digital assistant, cellular telephone and so on, as could STB 104. An STP server 170 may be provided for general content management and support of STB 104, such as with cable or TiVo systems. As is shown in FIG. 2, a remote control device 105 may be provided with the STB 104, or with the cable or TiVo device, to facilitate viewer interaction and request generation. A viewer's interest is expressed by pressing, for example, an "interest" button on remote 105 associated with the STB 104. Ultimately, this triggers the system to push content to a nearby display of device 102, for example. Or, interest may be expressed by the viewer directly browsing with the device 102 through a web interface (e.g., a web browser). The interest is expressed as a request that comes to a coordination server 110 by, for example, web enabled device 102 or STB server 170.

The primary function of the coordination server 110 is to interpret viewer interaction with the system, determine a list of needs, and then communicate with all of the other servers to satisfy these needs. When the viewer selects a link to primary information from the user interface, that request is mapped to an information template by the coordination server 110. Coordination server 110 retrieves a representation of the current context. In the preferred form, the context is determined from the closed captioning (CC) content processed by a data processing server 120. The context is used to bind parameters for the information requests specified in the information template that are needed by the query server 130. That is, the coordination server 110 uses the context of the viewer to determine what information repositories (not shown) contain relevant and useful information for the viewer. Such database repositories may take any of a variety of forms, including network accessible database systems and web sites and on-line real time information providers.

Once the database repositories are selected by the coordination server 110, queries are generated using query terms from database 150 and submitted to query server 130, which has access to the repositories via a network 160 (e.g., the Internet). Once returned to the query server 130, the data from the repositories is aggregated and handed off to the user interface (UI) server 140, which, along with direction provided by the viewer to the UI server 140, determines which collateral content is displayed and how it is formatted. UI server 140 formats the content by selecting a template from a selection of formatting templates. The formatting templates may be predefined templates related to the capabilities of the user interface of device 102.

Figure 3:
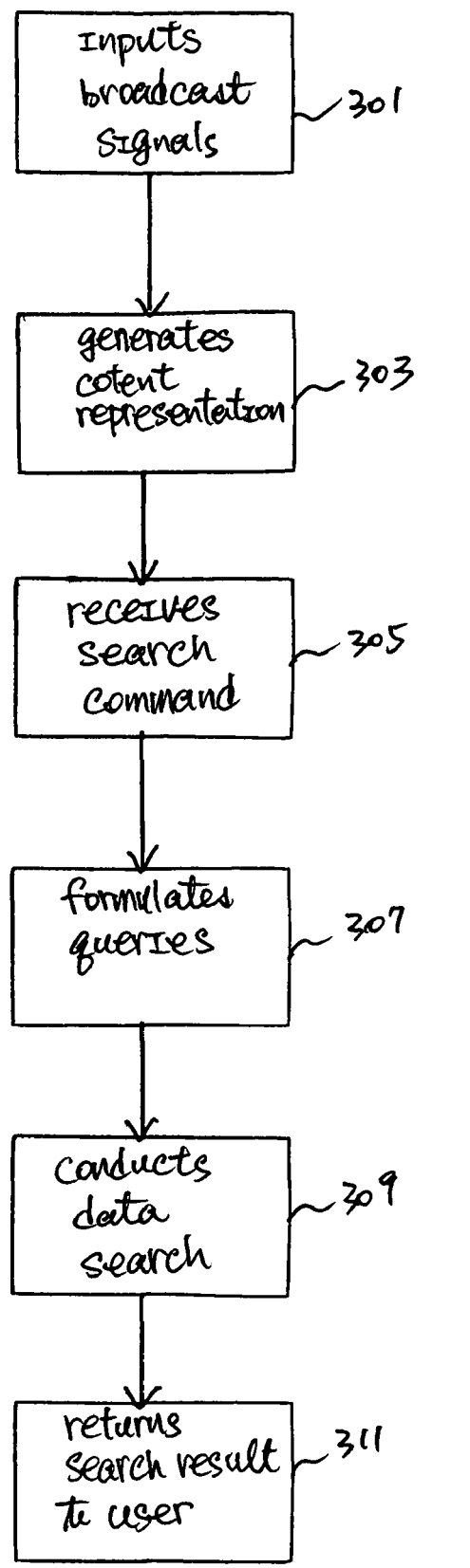
FIG. 3 is a flow chart describing exemplary steps implemented in an exemplary system.

FIG. 3 is a flow chart describing exemplary steps implemented in the system architecture 100. In Step 301, broadcast signals are input. The input signals may include an independent signal channels, physical or logical, to convey embedded signals, such as CC, that relate to at least partial content of the broadcast signals. In Step 303, a representation of the context and/or content of the broadcast signals is generated based on the embedded signals. After the context/content representation is generated, one or more search queries can be formulated based on the context/content representation along, or additionally on a command issued by a user (Steps 305 and 307). A data search is then conducted in one or more data sources based on the constructed queries (Step 309). In one embodiment, the data sources used for the data search is determined based on the type of program that the broadcast signals contain and/or the user command that indicates, for example, a specific type of information that he or she wants to receive. The search result is then returned to the user (Step 311).

Figure 4:
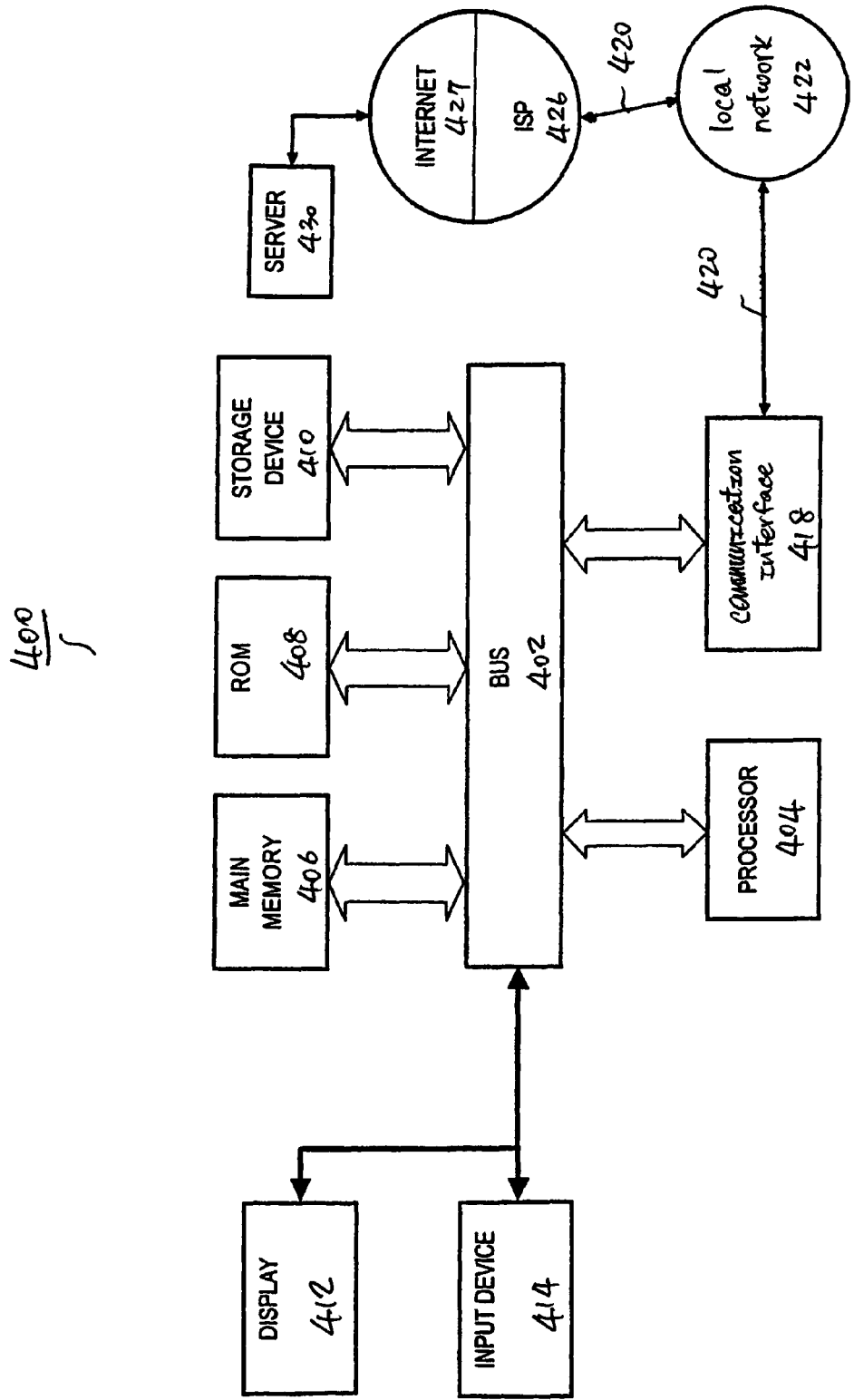
FIG. 4 is an exemplary data processing system upon which a system for providing collateral information to a user may be implemented.

FIG. 4 shows a block diagram of an exemplary data processing system that can be used to implement one or more devices in system architecture 100. The data processing system 400 includes a bus 402 or other communication mechanism for communicating information, and a data processor 404 coupled with bus 402 for processing data. Data processing system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by data processor 404. Data processing system 400 further includes a read only memory (ROM) 408 or other static storage device coupled to bus 402 for storing static information and instructions for processor 404. A storage device 410, such as a magnetic disk or optical disk, is provided and coupled to bus 802 for storing information and instructions.

The data processing system 400 may be coupled via bus 402 to a display 412, such as a cathode ray tube (CRT) or liquid crystal display (LCD), for displaying information to an operator. An input device 414, including alphanumeric and other keys, is coupled to bus 402 for communicating information and command selections to processor 404. Another type of user input device is cursor control 416, such as a mouse, a trackball, or cursor direction keys and the like for communicating direction information and command selections to processor 804 and for controlling cursor movement on display 412.

The data processing system 400 is controlled in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the disclosure. Thus, embodiments of the disclosure are not limited to any specific combination of hardware circuitry and software.

The term "machine readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of machine readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a data processing system can read.

Various forms of machine-readable media may be involved in carrying one or more sequences of one or more instructions to processor 404 for execution. For example, the instructions may initially be carried on a magnetic disk of a remote data processing system, such as a server. The remote data processing system can load the instructions into its dynamic memory and send the instructions over a telephone line using a modem. A modem local to data processing system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Data processing system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host data processing system or to data equipment operated by an Internet Service Provider (ISP) 426. ISP 426 in turn provides data communication services through the world large packet data communication network now commonly referred to as the Internet 427. Local network 422 and Internet 427 both use electrical, electromagnetic or optical signals that carry digital data streams. The signals through the various networks and the signals on network link 420 and through communication interface 418, which carry the digital data to and from data processing system 400, are exemplary forms of carrier waves transporting the information.

Data processing system 400 can send messages and receive data, including program code, through the network(s), network link 420 and communication interface 418. In the Internet example, a server 430 might transmit a requested code for an application program through Internet 427, ISP 426, local network 422 and communication interface 418.

The data processing system 400 also has various signal input/output ports (not shown in the drawing) for connecting to and communicating with peripheral devices, such as USB port, PS/2 port, serial port, parallel port, IEEE-1394 port, infra red communication port, etc., or other proprietary ports.

In one embodiment, the system forms its representation of the viewer's context based on the content of the television broadcast, e.g., from the associated CC text. For live news broadcasts, CC is typically generated by a human transcriber, in real time. Although, automated speech-to-text systems or other applications could also be used to generate CC. Regardless of how it is generated, there are several conventions for CC that are useful, such as using ">>" to indicate change in speaker. Frequently for broadcast news ">>>" is used to indicate a change in topic. CC has drawbacks as well. For example, it is acceptable and expected, according to the CC standards, to paraphrase to control the rate of text for CC. Also, CC frequently contains spelling errors, and since it is generated live for news there is no editing to correct such errors. In broadcasts which are not live, such errors tend to be much less common, unless the CC is generated live at the time of transmission or presentation. Finally, the use of the ">>>" topic change marker is optional, and is inserted based on the judgment of the transcriber. While these issues make using CC as a word-for-word transcription less than ideal, the system tends to be quite tolerant to this "noisy" environment.

The preferred embodiment uses a TiVo Personal Video Recorder (PVR) as its access point to the television broadcast. TiVo was chosen because of its current large market share. Additionally, there is a relatively large community actively working to extend TiVo's functionality and to provide tools for accessing its data. The TiVo box also provides the ability to store large quantities of video and have near instant random access to it for playback. The TiVo has been augmented with a program to export the CC contents (in ASCII format) called TiVovbi that has been wrapped by a server to export this data over TCP/IP sockets, as is known in the art. Another server was placed on the TiVo to export the current state of the TiVo user interface (e.g. main menu, show menu, play back of video, etc.) and events generated by the remote, such as when the "interest" button is triggered. These additional servers may be considered to be included as part of STB server 170 in FIG. 1.

It is important to note that the system is not dependent on the TiVo, but is capable of running on any system that is able to export CC, and optionally to export remote events generated by the user. A lightweight PC equipped with a CC decoder card would likely function just as well for providing CC data. However, such a configuration would not have all of the added advantages of a PVR, such as video storage and playback and added user interface features.

The data processing server 120 is responsible for analyzing the CC provided by the STB server 170 and for generating a representation of the viewer's context. Various approaches for constructing context representations can be used to generate a representation of the viewer's context based on the CC. Examples of methods and systems for constructing context representations can be found in U.S. patent application Ser. No. 10/629,602, entitled "AUTOMATIC METHOD AND SYSTEM FOR TRANSFORMING REPRESENTATIONS OF CONTEXT FOR USE BY INFORMATION SERVICES," filed Jul. 30, 2003; and U.S. patent application Ser. No. 10/629,680, entitled "METHOD AND SYSTEM FOR ASSESSING RELEVANT PROPERTIES OF WORK CONTEXTS FOR USE BY INFORMATION SERVICES," filed Jul. 30, 2003, both of which are incorporated herein by reference in their entireties.

As CC is streamed in, the first stage of the data processing server 120 tokenizes the input into words, numbers, CC specific markings, and so on. These tokens allow the rest of the system to have a standard representation of the CC. As each token is generated, it is streamed into a parser that builds a general representation of the story.

The parser includes a segmentation engine, a classification engine, and an entity detection engine. The parser maintains a representation of the viewer's current context. This representation is comprised of a term vector for approximating the content of the story, which is dynamically adjusted as tokens are streamed into the parser. A term vector is a message comprised of one or more terms from the parsed CC; these terms are used to determine the context. "Stop listed" tokens are words and symbols that are extremely undistinguishing (e.g., "a", "and," "the", etc.), so are not used to characterize the information context, or applied to the term vector. Detection of a new topic, and thus a new context for the viewer, is handled by the segmentation engine. When a segment change is detected, the ending segment's context representation is archived to the data store 150 and a new context representation is initialized.

The context contains not only the term vector representation of the news story, but also a list of topics the story could fall under, and entities specifically referenced by the story. All of the features of this representation are then used to determine what information would be useful and relevant to the viewer, and what repositories should be queried. In the preferred form, the system currently has two methods for segmenting stories. The first is to use the CC new topic marker ">>>". The CC transcriber frequently enters this marker whenever she deems the topic to have switched. The transcriber must make this judgment without knowing what is actually coming up, as it is done in real time. The marker must be entered before she begins transcribing the next story. It is also optional for the transcription to include these markers. That being said, when the markers are present they are usually highly accurate. If there is an extra marker, it is debatable as to Whether it would be appropriate to generate a new context. Typically, when there is an extra marker a new side or tangent of the story is being discussed, and the system is quite tolerate of this. In fact, it is possible that the more fine-grained segmentation could be beneficial.

When these segmentation markers are not present, the system relies on cue phrases to detect the beginning of a news story. The vocabulary of cue phrases is based on typical segue way words, such as "coming up next . . . ", anchor to reporter segue way, "and now to our reporter in . . . ", and commercial break and return from commercial break phrases, such as "we'll be right back". In cases where both are provided, the ">>>" CC topic change marker provides most of the information to the segmentation engine.

Tags for topic categories are generated by the classification engine. Examples of topic tags include, but are not limited to, "medical", "Middle East", "weather", and "sports". Each topic has its own classifier, and it should be noted that the classifiers are not mutually exclusive by design. For example, if the story is classified as being relevant to the Middle East, the coordination server 110 will request information from repositories that are local to the Middle East. Whereas, if the story is classified as "medical", high detail sources specific to the medical domain can be queried. Term vectors are analyzed within a given topic, to see if a given term occurrence meets threshold requirements. A given story could be tagged by several classifiers. In the preferred form, information is only gained through positive recognition by a classifier of terms related to the topic. Negative information may optionally be utilized in other embodiments.

Each classifier contains a list of words and phrases, or a vocabulary for each topic. Each vocabulary may be hand-built, wherein entries may be selected based on their value as discriminators, judged by Term Frequency Inverse Document Frequency (TFIDF). In other embodiments, the vocabulary may be built in other manners, such as automatically, or it may be provided by a third party. The manner of building the vocabulary is not particularly significant. Each entry is given a value, again based on its discrimination value. The overall classifier is then given a threshold. Each classifier keeps a running counter that is reset for every segment. When an entry in the vocabulary is seen, the classifier adds its value to the counter. If the counter ever crosses the threshold, the classifier will then tag the story as being of the topic associated with that vocabulary.

It should also be noted that vocabulary entries can be made with negative entries, should there be words or phrases that are inversely correlated to the topic of consideration. However, this could raise a problem for stories that cross the threshold and then are brought back under the threshold by negative words. Currently the system tags the story whenever the threshold is crossed, and will not remove a tag from a story.

The third and final piece of information contained in the context representation is a list of identified entities. Entities are generally specific proper nouns that the overall system has extended knowledge of, which can be presented to the viewer. Examples of entities include, but are not limited to, the names of businesses or their products, countries, Congressmen, specific medical terminology, such as diseases or drug names, and so on. Entities are detected in a very straightforward manner. The parser is initialized with a mapping of sequences of tokens (i.e., phrases) to entity codes. When a known token sequence is seen, the corresponding entity code is then added to the current segment's context representation. It should be noted that a given entity code could have several phrases that trigger it, and a given phrase can trigger multiple entities, for example, the business entity code for Sony could be triggered by the tokens "Sony" or "Vaio", and the token "Microsoft" might generate entity codes for the business Microsoft and for the name "Bill Gates".

The query server 130 performs data acquisition from network accessible 160 sources, as well as providing caching support for this information. The underlying system for data acquisition used by query server 130 in the preferred embodiment, is based on the Info Source Adapter (ISA) system, known in the art. To gain access to a data source through the ISA system, a definition for that source must be written in the ISA system's XML based language. Requests can then be made to an ISA server (e.g., query server 130) specifying only the information that is desired, along with any information that is relevant for the ISA system to gather the requested information. For example, to get the price of Microsoft stock, a request would be generated for "stock_price" and the variable "ticker_symbol" would be bound to "MSFT". The ISA server would then identify what information repository or repositories contain the requested information, a query would be generated, and the data would be retrieved and returned to the requestor. When many viewers are using the system, the caching implementation not only reduces load on the system, but also on the information repositories it uses, by shielding them from multiple (i.e., redundant) requests. It also effectively reduces source to viewer latency.

The results of the query are routed back to the UI server 140. The UI server 140 selects an information-formatting template based on the primary information being explored by the viewer, or context. This formatting template is then applied to the data generated by the query server 140, which was forwarded to the UI server 140 through the coordination server 110. In the preferred embodiment, there is a one-to-one mapping between information templates and information formatting templates, but this need not be the case in other embodiments.

While the foregoing has described what are considered to be the best mode and/or other preferred embodiments, it is understood that various modifications may be made therein and that methods and systems according to this disclosure may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

For example, several methods could be implemented for altering the segmentation engine when the CC topic change marker is not present. Concepts related to discourse cues and the idea of looking for orthographic markers could be implemented, as for example discussed in Hirschberg, J., and Litman, D., *Empirical Studies on the Disambiguation of Cue Phrases*, Computational Linguistics, 19(3): 501-529, (1993). A real time implementation of Text Tiling for broadcast news could also be implemented when no discourse cues are present, as, for example, discussed in Hearst, M. A., *Multiparagraph Segmentation of Expository Text*, Proceedings of the ACL, (1994).

Two methods of segmentation which could also be implemented were discussed Mani, I., House, D., Maybury, M., Green, M., *Towards Content-Based Browsing of Broadcast News Video*, Intelligent Multimedia Information Retrieval, pp. 241-258, (1997). One method uses cue phrases of fine resolution to detect four different categories of segments based on varying discourse cues. The other method detects a handoff between the anchor and the reporter, based on discourse patterns and the use of names. Not only does this method identify story segments, but it also identifies the names of the anchor and the reporter, which could be valuable to facilitate exclusion of these from queries.

The addition of other forms of media into the system can also be accommodated, as previously discussed. The preferred embodiment discussed the use of primarily Internet based information repositories, however, within the system itself there may be provided large quantities of content (e.g., broadcast news), which may be segmented and indexed before use. Providing access to these content segments through an efficient and easy story level interface would be highly useful and introduce greater flexibility and value into the system. In other forms, integration of the system with the viewer's television watching environment may be provided, such as merging information display with the television itself, and more natural interfaces potentially using speech recognition. In some form, a split screen or window approach may be provided in a STB, rather than requiring a separate device.

As previously mentioned, an exemplary system of this disclosure can be implemented for a wide variety of programs or for viewer interaction with all television programs. As an example, one type of television program to consider is sitcoms. Viewers of the evening news have different goals or needs for their interaction than do viewers of sitcoms. Capturing these differences in the viewer's context is important and will dictate what information is presented. For example, sitcom viewers would more likely be interested in fan sites, show listings, or plot and character summaries. Viewers might be interested in the actors and actresses, for example, learning what movies they have appeared in, or when is the next time they will be on TV, and so on. There are many different areas of television to explore, including: do-it-yourself shows, cooking shows, documentaries (nature, history, etc.), kids television, sports, and even commercials, all of which have their own context and method for which to interact with the viewer.

Beyond providing collateral content based on user request, in various embodiments, the present invention may include providing collateral content continually and automatically or as determined by triggers of various kinds monitoring the primary content, for example, a topic. Therefore, a system in accordance with the present disclosure could provide content as previously described, but as a function of the primary content without the need for a user request. In such cases, these other approaches to providing collateral content may be a companion or an alternative to providing content in response to a user request. Such other manners of providing collateral content could be provided as a function of a variety of factors or parameters. When provided automatically, the category of content (e.g., related coverage, focused opinions, in depth analysis, and so forth) could be predetermined or preset by the user or by the system, as examples, could be determined based on past history (e.g., categories most frequently requested by the user or the STB), could be determined based on the user's role (e.g., child, medical researcher, financial analyst, etc.), could be determined as a function of the freshness (or date) of available collateral content, or could be determined as a function of a strength of correlation with the primary content. Other implementations for determining the collateral information may also be used, including approaches for determining a category, individual content items or files within a category, and/or individual content items or files among the categories.

The disclosure has been described with reference to specific embodiments thereof. It will, however, be evident that various modifications and changes may be made thereto without departing from the broader spirit and scope of the disclosure. The concepts described in the disclosure can apply to various operations of the networked presentation system without departing from the concepts. The specification and drawings are, accordingly, to be regarded in an illustrative rather than a restrictive sense.

APPENDIX

| Acronym List | |
|---|---|
| CC | Closed Captioning |
| DB | Database |
| HTML | Hyper-Text Mark-Up Language |
| IP | Internet Protocol |
| IR | Information Retrieval |
| ISA | Info Source Adapter |
| NOD | News On Demand |
| PC | Personal Computer |
| PVT | Personal Video Recorder |
| STB | Set Top Box |
| TF | Term Frequency |
| UI | User Interface |

What is claimed is:

1. A system for providing collateral information comprising:
   at least one primary user interface means configured to receive primary audio or video content from one or more primary content sources, said primary user interface means including means for presenting said primary audio or video content and means for receiving a user content request;
   an interpreter coupled to said primary device and configured to determine a context of the primary audio or video content by analyzing the primary audio or video content;
   a query manager configured to obtain collateral content from selected collateral content sources as a function of the context of the primary audio or video content, wherein the collateral content sources are selected according to an identified type of the primary audio or video content; and
   at least one secondary user interface means configured to receive the collateral content from the selected collateral content sources.

2. A system for providing collateral information comprising:
   at least one primary device configured to receive primary audio or video content from one or more primary content sources, said primary device comprising a user interface including means for rendering said primary audio or video content and means for receiving a user content request;
   at least one secondary device configured to receive collateral content from one or more collateral content sources via a UI server configured to apply at least one format template to said collateral content;
   a coordination server configured to determine a context comprised of one or more predefined topics and entities, said coordination server including:
      1) a segmentation engine configured to segment said primary audio or video content into multiple sub-contents according to terms or cues derived from the primary audio or video content matching predetermined terms or cues;
      2) a classification engine coupled to a database comprising a set of words and phrases for each of said topics, and configured to determine, for each sub-content, which of said topics form part of the context, by comparing terms or phrases in each sub-content with said set of words and phrases of each of said topics; and
      3) entity detection engine configured to determine the presence of one or more entities from a list of predefined entities by comparing said primary audio or video content with the list of predefined entities;
   and
   a query manager configured to generate a query from the context and to query the collateral content sources for collateral content, and to provide said collateral content received by the at least one secondary device to said UI server.

3. The system according to claim 1, wherein:
   the primary audio or video content is a broadcast program included in broadcast signals received by the system; and
   the identified type of the primary audio or video content is an identified type of the broadcast program.

4. The system of claim 3, wherein the broadcast program is distributed over a computer network.

5. The system of claim 1, wherein the interpreter is configured to determine the context of the primary audio or video content by analyzing signals related to at least partial content of the primary audio or video content.

6. The system of claim 2, wherein the coordination server is configured to determine the context by analyzing signals related to at least partial content of the primary audio or video content.

7. The system of claim 2, wherein the predetermined terms or cues include a new topic marker included in closed captioning content or a list of predetermined cue phrases.

8. The system of claim 2, wherein the query manager selects the collateral content sources to which the generated query will be sent according to an identified type the primary audio or video content.

9. A method for providing collateral information to a user accessing primary audio or video information via a first user interface, said method comprising:
   defining a context from said primary audio or video information;
   deriving a user's probable collateral information needs from the context of the primary audio or video information;
   mapping the needs to one or more information repositories according to an identified type of the primary audio or video information, wherein the one or more information repositories are selected according to the identified type of the primary audio or video information;
   querying the information repositories and receiving collateral information satisfying the needs from the one or more information repositories;
   presenting the collateral information via at least one user interface, which may include the first user interface; and
   providing user controls via the at least one user interface to facilitate exploration of the collateral information by the user.

10. A method for providing collateral information to a user related to primary audio or video information comprising the steps of:
   receiving the primary audio or video information;
   accessing a signal related to at least partial content of the primary audio or video information;
   defining a context from said primary audio or video information and the signal;
   deriving a user's probable collateral information needs from the context according to an identified type of the primary audio or video information;
   mapping the needs to one or more information repositories based on the types of the needs, wherein the one or more information repositories are selected according to the identified type of the primary audio or video information;
   retrieving collateral information satisfying the needs from the selected one or more information repositories; and
   presenting the collateral information via a user interface.

* * * * *